March 20, 1956     H. S. V. JÄRUND     2,738,631
APPARATUS FOR CONTINUOUSLY PRODUCING
PACKAGES FROM A TUBE OR SLEEVE Filed Dec. 26, 1951     6 Sheets-Sheet 1

Inventor:
Harry Sigurd Valdemar Järund,
by Pierce, Scheffler & Parker,
Attorneys.

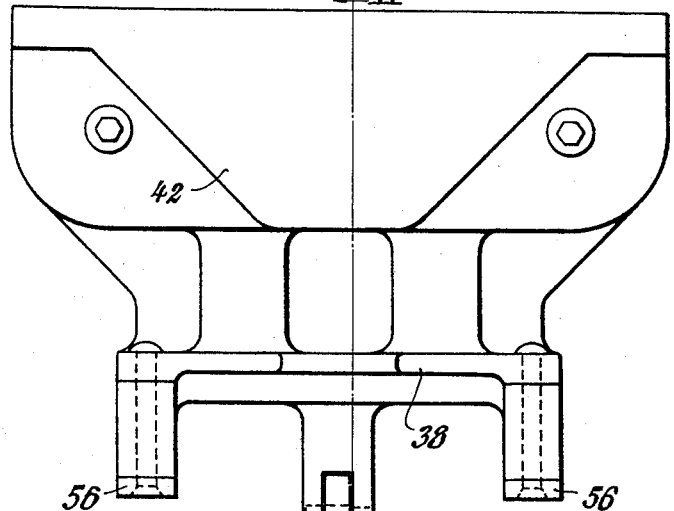
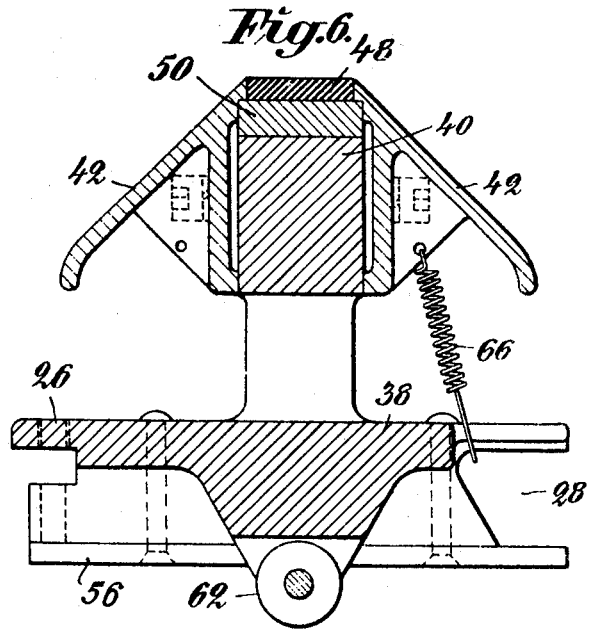

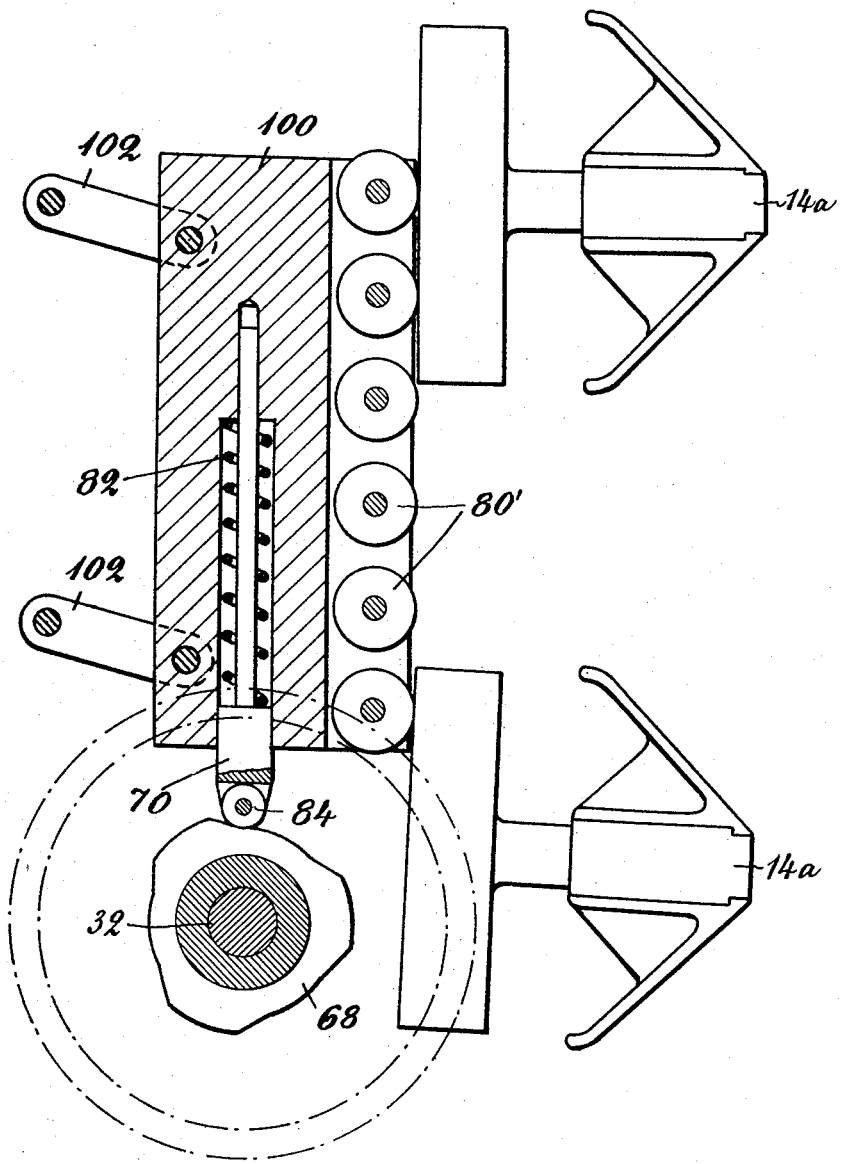

United States Patent Office 2,738,631
Patented Mar. 20, 1956

2,738,631
APPARATUS FOR CONTINUOUSLY PRODUCING PACKAGES FROM A TUBE OR SLEEVE

Harry S. V. Järund, Lund, Sweden, assignor, by mesne assignments, to Hermorion Ltd., Toronto, Canada Application December 26, 1951, Serial No. 263,357

Claims priority, application Sweden December 30, 1950

21 Claims. (Cl. 53—180)

The present invention relates to an apparatus for continuously producing pillow shaped or tetrahedron shaped packages from a tube, sleeve or the like made of paper, cardboard or other ribbon or foil material utilizable in the packing industry.

An object of the invention is to provide a machine in which the tube or sleeve shaped element, while it is continuously fed through the machine at uniform intervals, is flattened and simultaneously sealed together along narrow zones crosswise to the longitudinal direction of the tube or sleeve.

Another object is to provide a machine or device in which the members for flattening and sealing together of the tube follow the movement of the tube being deformed during the flattening operation substantially without sliding between said zones to be sealed together and the working surfaces of said flattening members.

Still another object, particularly in apparatus for alternatively flattening the tube or sleeve shaped element in two mutually perpendicular directions for the formation of tetrahedron shaped packages, is to provide means for beginning the shaping of a following tetrahedron before the immediately preceding tetrahedron is completed, thereby to counteract the formation of creases in the flattened zones and to make possible an increase of the machine speed.

A further object is to provide a machine for producing the packages in question in connection with their filling with the material to be packed, in which event the filling may be performed intermittently or, particularly in the case of liquid material, continuously.

In order to attain the above objects and to gain other advantages which will be obvious from the following description, the invention in its essential parts consists in a machine frame supporting pairs of oppositely disposed carrying members movable in closed paths and supporting the flatttening and shaping members proper which are hereinafter termed "clamp jaws," guiding means for imparting to the clamp jaws a smooth run in a closed path and the movement to and from one another necessary for the shaping and flattening, pressure-generating and pressure-transmitting means for bringing about the necessary sealing pressure between each cooperating pair of clamp jaws, and finally means for feeding a tube or sleeve element between the cooperating pairs of clamp jaws.

In the following, the invention will be described in detail with reference to the accompanying drawings in which by way of example but not in a limiting sense there is illustrated an embodiment for the production of tetrahedral packages by alternatingly flattening and sealing the tube shaped element in two mutually perpendicular directions. A device for the production of pillow shaped packages is obtained by omitting one pair of clamp jaw carriers, said device being so obvious from the one shown that it has not been shown separately illustrated.

In the drawings:

Figs. 5 and 6 are similar plan and sectional views of a counterpressure jaw not provided with a heating element, Fig. 6 being a section on line VI—VI of Fig. 5;

Fig. 8 shows another embodiment of the device for bringing about the sealing pressure.

The illustrated device consists of an outer machine frame 10, in which there are easily demountably arranged four component frames 12 oppositely disposed in pairs and each carrying an endless chain conveyor 16 provided with clamp jaws or flattening jaws 14a, 14b together with driving and guiding means for said conveyor. In at least one component frame of each of the oppositely disposed pairs there is further provided a device for bringing about the necessary flattening pressure.

Figure 1:
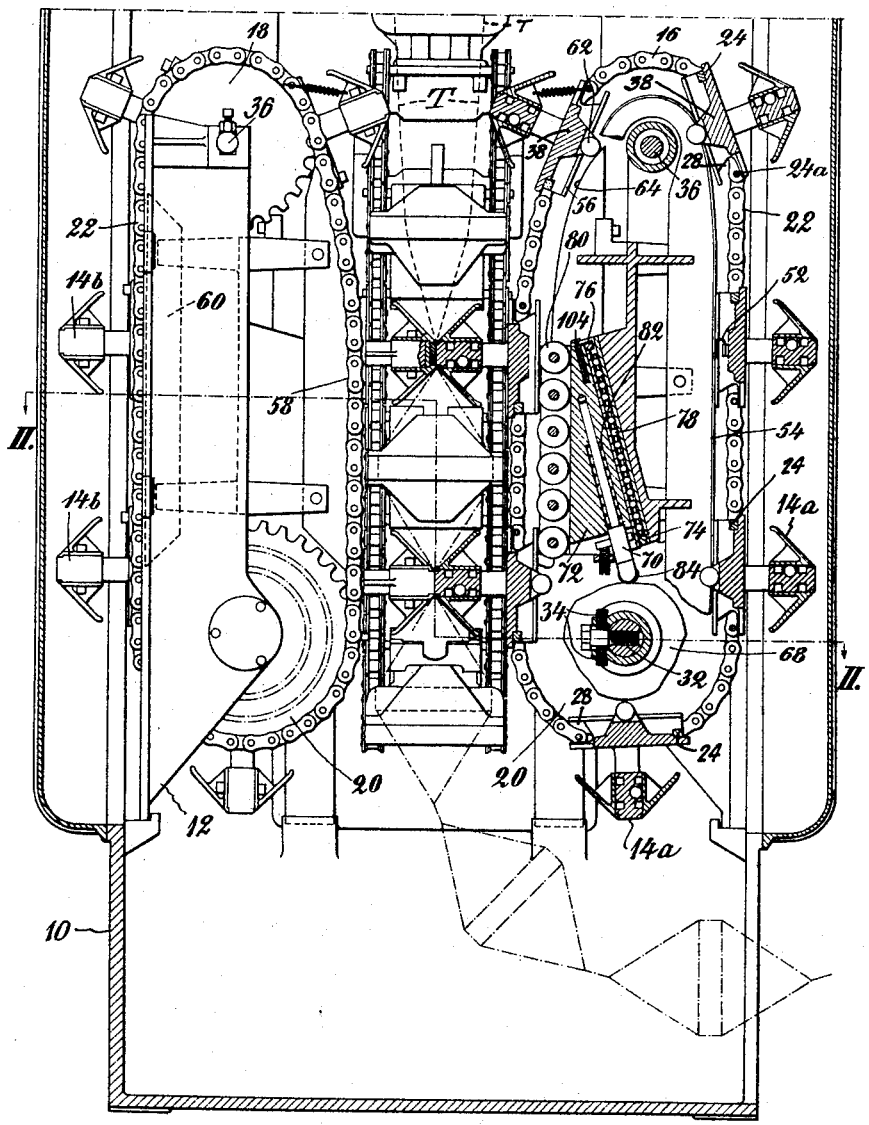
Fig. 1 is a vertical section of the apparatus on line I—I of Fig. 2.
Figure 2:
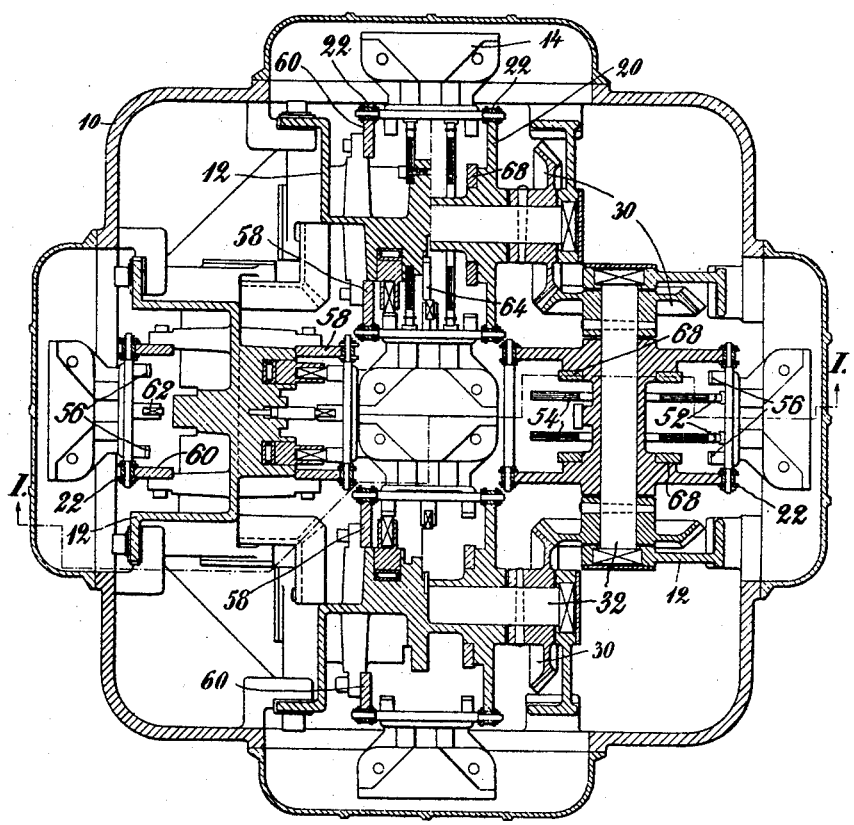
Fig. 2 is a horizontal sectional view taken on line II—II of Fig. 1.
Figure 3:
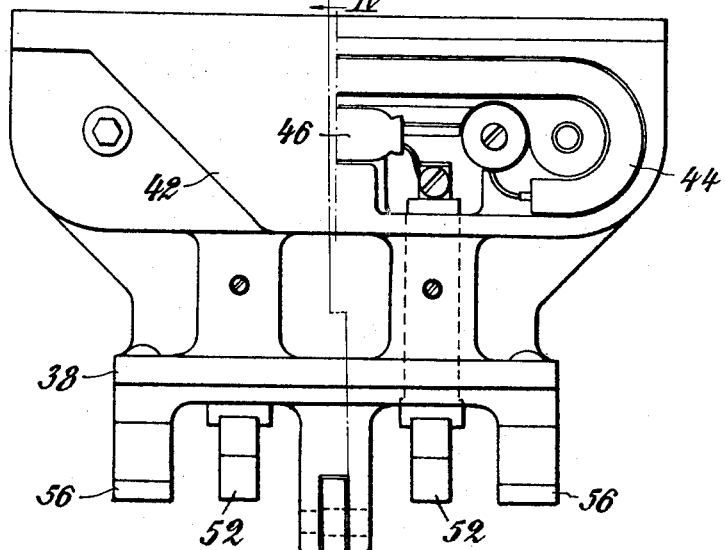
Fig. 3 is a plan view, in part as seen with a cover element removed, of a clamp jaw provided with a heating element.
Figure 4:
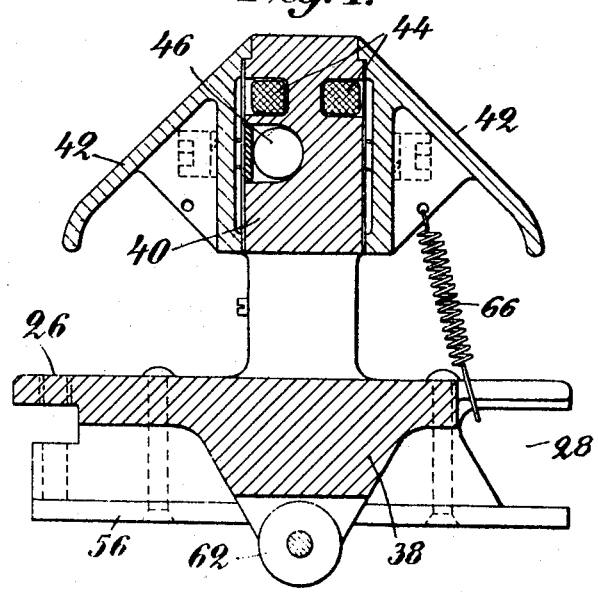
Fig. 4 is a transverse section through the same as seen on section line IV—IV of Fig. 3.

In the illustrated embodiment, each of the endless chain conveyors 16 consists of two link chains 22 running over double upper chain wheels 18 and likewise double lower chain wheels 20, said two link chains 22 being interconnected by transverse stays 24 and 24a rotatably mounted in the chain links and carrying the pressure backs or clamp jaws 14a, 14b. The leading stay 24 of each clamp jaw, considered in the direction of motion of the chain conveyor, is so shaped, e. g. of edged profile, and fitted in a correspondingly shaped slot in the clamp jaw, that this stay and the clamp jaw are not rotatable in relation to each other, see Fig. 1. Furthermore, in each clamp jaw there may be provided holes 26 (Figs. 4 and 6) in which may be introduced screws for locking each clamp jaw to its leading stay 24. However, the trailing stay 24a must not be locked to the clamp jaw but is instead located in a recess 28 in the rearward part of the clamp jaw so that the clamp jaw has a certain freedom of motion relatively to the trailing stay 24a. This is necessary, partly because the linear distance between the stays 24 and 24a will vary when the chain, during its motion, passes over a chain wheel or a bend on the guide curve which brings about the successive approach of the clamp jaws towards the tube being shaped, partly in order to render possible an oscillatory or rocking motion of the clamp jaw, more clearly described hereinafter, with the leading stay 24 as axis of rotation.

The shafts 32 of the lower chain wheels 20 carry at their ends bevel pinions 30 which mesh in pairs with each other so that an operative connection is maintained between the different chain conveyors. One of the lower chain wheels is driven by a motor, not shown, and all lower chains are displaceable angularly to a certain extent on their shafts 32, thus making it possible to bring about the fine adjustment of the chain systems cooperating in pairs and by this means to adjust the packages to equal length when the assembling of the machine is completed. This adjustment of the chain systems is effected by means of screws 34.

The upper chain wheels 18 are journalled on fixed shafts 36 which, however, are adjustable in order to render possible the appropriate tensioning of the chains.

The clamp jaws are of two kinds, namely one type provided with heating elements and metallic working surface in good heat conducting relation to the heating elements, which type of clamp jaw will henceforth be called element jaw 14a, and one type without heating elements, provided with an elastic working surface, e. g. of hard rubber, silicon rubber or other synthetic material, having a satisfactory elasticity at the working temperatures in question, which type will hereinafter be called counter-pressure jaw 14b. One of two cooperating chain systems carries only element jaws 14a and the other only counter-pressure jaws 14b.

Each clamp jaw consists in its principal parts of a base plate 38 in which the stays 24 and 24a by which the jaw is carried by the chain conveyor are fitted, and a head 40 provided with obliquely rearwardly extending wings or flaps 42 which serve in part as supports for a package being shaped, particularly if, during the shaping operation, it is being filled with the material to be packed, and in part as a shelter for heating elements 44 e. g. so-called "backer elements," and for a temperature-regulating thermostatic switch 46 inserted in the element jaws 14a. The wings 42 of the counter-pressure jaws 14b serve as a longitudinal lateral support for the elastic counter-pressure plate 48 and a steel plate 50 carrying the same and preferably milled in such a way as to support the elastic counter-pressure plate 48 at the end edges when said elastic plate 48 is placed under pressure.

Moreover, the base plates 38 of the element jaws 14a are provided with electrical contacts 52 adapted to slide on current-carrying bars 54 or the like and connected to the heating elements 44 and the thermostat 46, said latter being wired up to one of the heating elements in each element jaw for connecting said element into circuit or disconnecting the same at a narrow temperature interval in order to render possible the maintenance of the desired temperature at as small variations as possible.

Of course, instead of resistance elements high frequency coils may be inserted in the heating jaws for effecting the sealing by inductive heating of the joint.

Further, all of the base plates 38 are provided with pressure-absorbing bars 56, preferably of hardened steel, for absorbing and transmitting the pressure necessary for the sealing. The chains run on guide surfaces 58 along the working path of the clamp jaws for bringing about the approach of the cooperating clamp jaws to each other in pairs and on other guide surfaces 60 along the return part of the appertaining chain conveyor in order to ensure to the chain systems a smooth and silent run.

Finally, the base plates 38 of the clamp jaws are provided with guide rolls 62 adapted to cooperate with a cam or pressure rail 64 during that portion of the working stroke of each clamp jaw while the shaping up to the final flattening and sealing are carried out. Through the cooperation of the guide rolls 62 and the rails 64, an oscillatory motion is imparted to the jaws about the leading stay 24, while the rearward part of the base plate is being raised from contact with the trailing stay 24a against the action of tension springs 66 connected between said trailing stay and the rearward flap 42 of the associated clamp jaw, considered in the direction of motion. Of course, it also is possible to make the jaw oscillate about the trailing stay against the action of an elastic force which normally holds the jaw against some support or stay in the conveyor chain. This oscillatory motion reduces to a minimum the relative sliding of the clamp jaws and the portions of the tube which they contact during the compressing and sealing operations.

For producing the uniting or sealing pressure proper there is provided, at least for one of each two cooperating chain conveyors, a special pressure-generating and pressure transmitting mechanism. This pressure-transmitting mechanism, which is operated by a pair of cams 68 and cam followers or plungers 70, the cams being mounted on the shaft 32 of a lower chain wheel 20, consists of a wedge shaped pressure-roll holder 72 which, between two stops 74 and 76, is slidable on a plane needle bearing 78 and, at its wedge surface opposite to the bearing surface, carries a series of pressure-transmitting rolls 80 which engage the bars 56 on the base plates 38 of the clamp jaws as they move into the compressing position. For absorbing and equalizing the pressure, pre-tensioned springs 82 are preferably disposed between the pressure-transmitting plungers 70 and the wedge shaped pressure-roll holder 72, and in order to reduce friction each plunger 70 is preferably provided with a roll 84 resting upon the cam 68.

Figure 7:
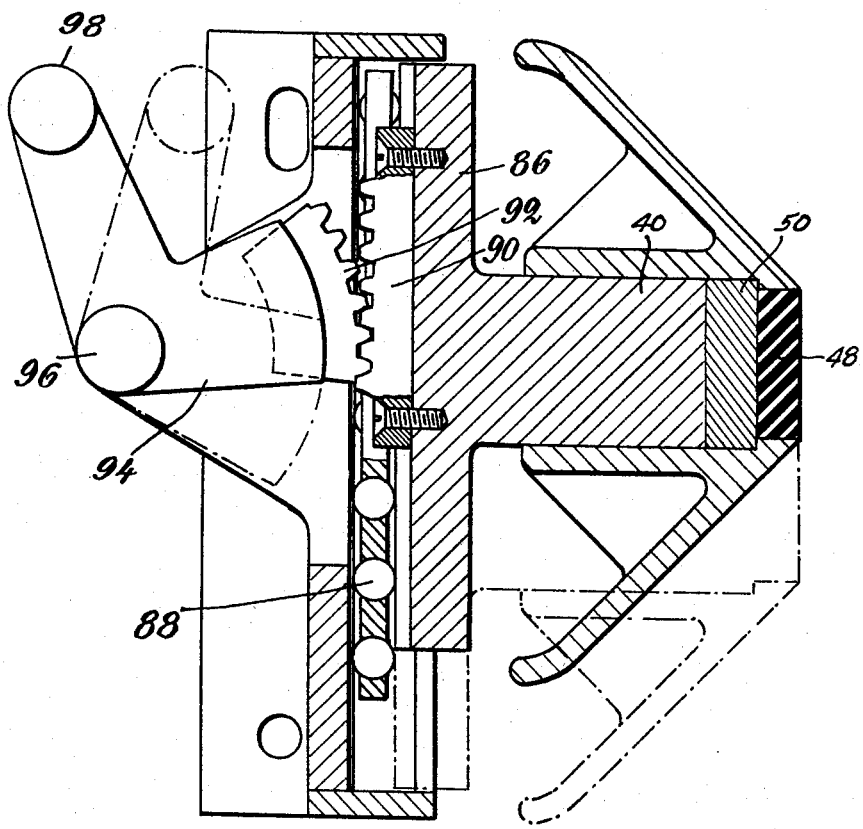
Fig. 7 shows another embodiment of the device for bringing about the composite movement of the clamp jaw.

Fig. 7 illustrates, as mentioned above, a modified embodiment of the device for accommodating the motion of the clamp jaws to the change of motion and change of speed of the tube surface portion resting against the working surface of the associated clamp jaw during the shaping operation proper. According to the modified embodiment, the base plate of the clamp jaw is in the form of a slide 86 resting upon a plane roller or needle bearings 88 and carrying a toothed rack 90 meshing with a segmental rack 92 formed on one arm 94 of a two-armed lever which is rotatively mounted on an axle 96 and the other arm of which is provided with a roll 98 or the like adapted, during the composite motion of the clamp jaw, to cooperate with a cam or the like so that the clamp jaw, through the intermedium of the toothed gear 90, 92, will be displaced in relation to the chain carrying the clamp jaw.

Fig. 8 shows a further embodiment of the pressure device producing the sealing pressure. This embodiment differs from that illustrated in Fig. 1 substantially in that the wedge shaped holder is replaced by a plane roll holder carried by a link mechanism. As before, in this modification the pressure is brought about by a plunger 70 cooperating with a cam 68, the plunger end carrying a roll 84 to reduce friction, said roll resting upon the cam 68. The plunger 70 is fitted in a bore in a slidable roll holder 100 carrying the pressure rolls 80' and is pressed to the cam 68 by a pre-tensioned spring 82 or the like. The roll holder 100 is carried by two link arms 102 so arranged that the roll holder together with the pressure rolls 80 are forced against the pressure bars 56 of the clamp jaws, thus transmitting the pressure to the clamp jaws proper when the plunger roll 84 rolls up upon a swell of the eccentric 68.

The apparatus according to the invention may advantageously to coupled to a tube or sleeve shaping machine of any desired kind, e. g. a device according to my copending patent application Serial No. 263,358, so that a tube or sleeve shaped in such a machine is fed, immediately after shaping, automatically into the machine according to the invention for formation into pillow or tetrahedron shaped packages. In this case, the combined machine unit should also be equipped with a device for intermittently or continuously filling the packages with the article to be packed, for example as described in my copending application Serial No. 288,639, filed May 19, 1952, now U. S. Patent No. 2,687,740, in connection with the production of the separate packages.

The operation of the apparatus is as follows:

A tube or sleeve shaped element T of some suitable foil or web material, which in itself is thermoplastic or impregnated with a thermoplastic adhesive, is introduced into the machine until it is clasped and by compression is retained in place by two cooperating clamp jaws. The electric current to the heating elements in the element jaws has previously been turned on so that these jaws have assumed the temperature suitable for sealing. The driving mechanism is then engaged so that the chains with the clamp jaws carried by them begin their motion, and a possibly existing filling device is started.

During their circulating motion the chains with the clamp jaws 14a, 14b will, immediately after having left the upper chain wheel 18, pass on to the inner guide or rail 58 so that the clamp jaws of two opposite chains will successively approach each other. Simultaneously, the guide rolls 62 come into contact with the rails 64 cooperating with them to bring about the previously mentioned oscillatory motion of the clamp jaws for engaging, without any appreciable slide, the surface of the tube element. These guides should preferably be so extended that a succeeding pair of clamp jaws has at least contacted and started the compression of the tube element, before the immediately preceding pair of clamp jaws has arrived at the position for complete compression, the purpose of this being to avoid the formation of creases or folds in the tube element above the shaping zone, which creases or folds might later have a disturbing effect at the sealings and impair the appearance of the finished package.

Particularly in cases where the apparatus according to the invention is directly coupled to a tube shaping machine, e. g. according to my above mentioned copending patent application, Serial No. 263,358, the frictional resistance caused by the tube shaping members then becoming comparatively high, it may be suitable not to let the clamp jaws take the entire work of feeding the tube element being shaped through the packing machine but, for this purpose, to provide feed rolls or similar elements between the tube shaping members and the packing machine according to the invention in order, so to speak, to transport the tube element through the last-mentioned machine. This arrangement is suitable from that point of view that a tube, which at one end is forcibly guided through a fixed cylinder and is subject to pull from the other end while being compressed, will obtain depressions between said two ends which may give rise to inwardly extending creases at the ends of the transverse joints in the production of tetrahedron shaped packages.

When the clamp jaws, as the chains continue to travel, approach the sealing position proper, the guide rail 64 is so shaped that the clamp jaws 14a, 14b, under the influence of the springs 66, are swung back into contact with the trailing stays 24a, the working surfaces of the two cooperating clamp jaws then becoming substantially parallel. Simultaneously, the pressure-absorbing bars 56 move on to the pressure rolls 80 while the plungers 70 and thus the wedge shaped pressure-roll holder 72 are in retracted position. Preferably, the pressure-roll holder 72 is so dimensioned that a clamp jaw passes on to the pressure rolls at the same time as a preceding clamp jaw slides off said rolls. When a clamp jaw has passed on to the pressure-roll bed to such an extent that its center line has traveled past the center line of the first roll, the rolls 84 of the plungers 70 will roll on to a swell of the cams 68, whereby the plungers 70 and thus the wedge shaped holder 72 will be pushed upwards while transmitting pressure via the pressure rolls 80 and the bars 56 to the clamp jaws so that these between them compress the transverse joint for obtaining a secure bond. Immediately before a clamp jaw slides off the pressure-roll bed and the next clamp jaw slides on to the same, the plunger rolls 84 will ride off of the swell of the cam 68, the wedge roll holder 72 then being drawn back under the influence of its own weight or possibly by the agency of a spring 104. In order to secure the return of the rolls also in the plane roller bearing 78 supporting the pressure-roll holder 72 there is provided on said pressure-roll holder a driver 76, and besides at the other end of the plane roller bearings there is provided a stop 74 fastened to the machine frame, for limiting the return movement of the rolls in the bearings 78.

After the clamp jaws have left the pressure-roll bed, the chain conveyor carrying the clamp jaw will be guided round the lower chain wheel, whereby the clamp jaws will be removed from each other, while the finished packages proceed and leave the machine as a continuous string of pearls, or the like, from which the separate packages may then be cut off by means of a suitable cutting-off device.

In the apparatus above described, the packages may either be produced in an empty state in order to be filled afterwards or be filled during the course of the production, e. g. as described in my copending application, Serial No. 288,639, filed May 19, 1952.

In the first-mentioned case, the clamp jaws may, in one of two cooperating conveyors for said jaws, be so designed as not to seal the transverse joints along their entire extent but to leave a short length, e. g. at one edge, open in order later to serve as filling opening. After the filling of such a package the opening may thereafter be sealed in a simple manner by compression under heat.

In the latter case with filling in connection with the production, filler pipes or the like may be introduced into the tube shaped element before it enters between the clamp jaws, and material may be filled in either intermittently or continuously while the machine is working continuously. In the case of continuous filling, which principally is effected in connection with liquid packing material, it has proved to be both possible and suitable to let the liquid filled in reach continually a level above the sealing place and, particularly in the case of foaming liquids, a level above the filling opening.

I claim:

1. In an apparatus for continuously producing packages from an elongated tube of a flexible and sealable material by compressing and sealing together opposite sides of the tube along narrow zones disposed transversely to the longitudinal axis of the tube; a machine frame through which the tube may be moved vertically downward, means for sealing opposite sides of the tube to each other, said sealing means comprising a pair of conveyor frames supported in said machine frame and at opposite sides of the path of travel of the tube, an endless conveyor supported on each of said conveyor frames for travel in an endless path, each conveyor path including a substantially vertically extending run and the vertically extending runs of the respective conveyors being substantially parallel and opposed to each other at opposite sides of the path of travel of the tube, means for driving said conveyors simultaneously and at the same rate for downward movement of said vertically extending and opposed runs of the respective conveyors, and cooperating means carried by the conveyors for compressing narrow transverse zones of the opposite sides of the tube into engagement and sealing the same to each other; said cooperating means comprising a set of clamp jaws supported upon each conveyor and extending towards the other conveyor at said opposed runs of the respective conveyors, the several jaws of each set being spaced apart to aline with a complementary jaw of the other set to flatten said tube and press the opposite sides thereof into engagement, at least one jaw of each complementary pair of jaws being provided with means for heating the zone being sealed, and means including a roller bed movable on one of said conveyor frames to increase the pressure between a pair of cooperating jaws during travel thereof down said opposed parallel runs of the respective conveyors.

2. The invention as recited in claim 1, wherein each of said conveyors includes a double link chain and cross stays rotatably mounted in sets of adjacent links of each chain and extending between said chains to hold the chains together, each conveyor frame includes an upper and a lower pair of sprocket wheels cooperating with the respective link chains, and said driving means includes gearing connecting sprocket wheels of the respective conveyors; and wherein each clamp jaw comprises a support spanning two adjacent cross stays and a head extending normal to the support at substantially the center thereof, the head terminating in a rectangular pressure surface having its major dimension extending parallel to said cross stays, and means securing the forward end of each clamp jaw support to a cross stay, the rear end of each clamp jaw support being recessed to loosely span the cross stay to the rear, as viewed in the direction of conveyor travel, of the cross stay secured to the forward end of that clamp jaw support.

3. The invention as recited in claim 2, wherein the paths of the conveyors between the upper sprocket wheels thereof and the upper ends of said opposed vertically extending runs are inclined to the path of movement of the tube and approach each other, in combination with means for moving each clamp jaw with respect to its supporting conveyor during travel thereof down said inclined section of a conveyor path to maintain the pressure surface of that clamp jaw in substantially non-slipping contact with the portion of the tube initially contacted by that pressure surface.

4. The invention as recited in claim 3, wherein said support of each clamp jaw is a base plate having a guide roll mounted thereon at the side opposite said head, and said moving means includes a cam rail on each conveyor frame at the inclined portion of the path of the conveyor supported by that conveyor frame, said cam rail being engaged by the guide roll to rock said base plate about its forward supporting cross stay as an axis.

5. The invention as recited in claim 4, wherein each clamp jaw includes tension spring means normally retaining the rear end of its base plate in engagement with the rear cross stay spanned by that base plate.

6. The invention as recited in claim 3, wherein the means for moving each clamp jaw with respect to its supporting conveyor comprises a roller bed, a base plate carrying the head of the clamp jaw and provided with a rack at the face thereof opposite the head, a lever pivoted upon said roller bed and having a segmental rack on one arm in mesh with the rack of said base plate, a roller on the other arm of said lever for cooperation with a cam rail, and rollers between said roller bed and said base plate.

7. The invention as recited in claim 1, wherein only one jaw of each complementary pair of jaws is provided with said heating means, and the other jaw of each pair is provided with a pressure surface comprising elastic material.

8. The invention as recited in claim 1, wherein the heating means provided on said jaws comprise electrical heating elements in the heads thereof, and electrical contacts are carried by the support of each said jaw and connected to the heating elements thereof, in combination with electrical conductor bars mounted on the conveyor frame of the conveyor carrying the jaws provided with said electrical heating elements.

9. The invention as recited in claim 8, wherein the heating means provided on each jaw comprises two heating elements mounted in the head thereof, one heating element being permanently connected between the electrical contacts and of less than sufficient capacity to maintain the jaw at the desired sealing temperature, and a thermostatic switch connecting the other heating element across said electrical contacts.

10. The invention as recited in claim 1, wherein each clamping jaw includes a head terminating in a pressure surface of rectangular form, the longer dimension of the pressure surface extending transversely to the direction of travel of the jaw, and wings extending obliquely rearwardly from the upper and lower edges of the pressure surface, as viewed when in engagement with the tube, to facilitate the shaping of the tube into package form.

11. The invention as recited in claim 1, wherein the adjacent clamping jaws of each set are spaced along their respective conveyors so closely that one cooperating pair of clamping jaws contacts the tube to initiate a shaping operation prior to the completion of the package-shaping operation of the preceding pair of cooperating jaws.

12. The invention as recited in claim 1, wherein said clamping jaws of one set include pressure rails for cooperation with the rollers of said roller bed; said means for driving said conveyors includes a shaft having an eccentric cam thereon; and said pressure-increasing means includes means supporting said roller holder on its conveyor frame for movement towards the pressure rails of the clamping jaws of the associated conveyor as they travel down the vertically extending run of that conveyor, and a plunger seated in the roller bed and spring-pressed into engagement with said cam, and spring means opposing movement of said roller bed by said plunger.

13. The invention as recited in claim 12, wherein the length of the roller bed in the direction of travel of the associated clamping jaws is such that the pressure rails of one clamping jaw slide upon the upper end of the roller bed as the pressure rails of the preceding clamping jaw ride off of the lower end thereof.

14. The invention as recited in claim 12, wherein the eccentricity of the cam and the path of movement are so related to the travel of the conveyor that the plunger rides up on the eccentric part of the cam only after the center line of the clamping jaw has moved beyond the uppermost roller of the roller bed and rides off of the eccentric part of the cam only after the center line of a clamping jaw has passed the lowermost roller of the roller bed.

15. The invention as recited in claim 12, wherein the roller bed is of wedge shape with a vertically arranged series of rollers at the face adjacent the clamping jaws, and the supporting means for said roller holder comprises a member with an inclined planar surface complementary to the inclined surface of said wedge-shaped roller bed, and rollers between said inclined surfaces.

16. The invention as recited in claim 12, wherein the supporting means for said roller bed comprises a pair of parallel links pivoted upon the associated conveyor frame and to said roller bed.

17. In an apparatus for continuously producing packages from an elongated tube of flexible and sealable material by compressing and sealing together opposite sides of the tube along narrow zones disposed transversely to the longitudinal axis of the tube and alternately at right angles to each other; a machine frame through which the tube may be moved vertically downward, two sets of sealing mechanisms each comprising a pair of conveyor frames supported in said machine frame and at opposite sides of the path of travel of the tube, an endless conveyor supported on each of said conveyor frames for travel in endless paths, each conveyor path including a substantially vertically extending run and the vertically extending runs of the conveyors of each path being in planes substantially parallel and opposed to each other at opposite sides of the path of travel of the tube, the planes of the vertically extending runs of the conveyors of the respective sets of sealing mechanisms being at right angles to each other, means for driving said conveyors simultaneously and at the same rate for downward movement of said vertically extending and opposed runs of the respective conveyors, and cooperating means carried by the conveyors for compressing narrow transverse zones of the opposite sides of the tube into engagement and sealing the same to each other; said cooperating means comprising clamp jaws supported upon each conveyor and extending towards the opposed conveyor at said opposed runs, the several jaws of each conveyor being spaced apart to aline with a complementary jaw of the opposed conveyor and the pairs of complementary jaws being carried in alternation by the opposed conveyors of the respective sealing mechanisms, at least one jaw of each pair of complementary jaws being provided with means for heating the zone being sealed and means including a roller bed movable on a conveyor frame of each sealing mechanism to increase the pressure between the jaws of each complementary pair during travel thereof down said substantially vertical carrier runs.

18. The invention as claimed in claim 17 wherein adjacent pairs of complementary clamping jaws of each pair of opposed conveyors are spaced so closely that one of said pairs contacts the tube to initiate a package shaping operation prior to the completion of a package shaping and sealing operation of the preceding pair of complementary clamping jaws of the same pair of opposed conveyors.

19. The invention as recited in claim 17, wherein each of said conveyors includes a double link chain and cross stays rotatably mounted in certain sets of adjacent links of each chain and extending between said chains to hold the chains together, each conveyor frame includes an upper and a lower pair of sprocket wheels cooperating with the respective link chains, and said driving means includes gearing connecting sprocket wheels of the respective conveyors; and wherein each clamp jaw comprises a support spanning two adjacent cross stays and a head extending normal to the support at substantially the center thereof, the head terminating in a rectangular pressure surface having its major dimension extending parallel to said cross stays, and means securing the forward end of each clamp jaw support to a cross stay, the rear end of each clamp jaw support being recessed to loosely span the cross stay to the rear, as viewed in the direction of conveyor travel, of the cross stay secured to the forward end of that clamp jaw support.

20. The invention as recited in claim 19, wherein the paths of the conveyors between the upper sprocket wheels thereof and the upper ends of said opposed vertically extending runs are inclined to the path of movement of the tube and approach each other, in combination with means for moving each clamp jaw with respect to its supporting conveyor during travel thereof down said inclined section of a conveyor path to maintain the pressure surface of that clamp jaw in substantially non-slipping contact with the portion of the tube initially contacted by that pressure surface.

21. The invention as recited in claim 20, wherein said support of each clamp jaw is a base plate having a guide roll mounted thereon at the side opposite said head, and said moving means includes a cam rail on each conveyor frame at the inclined portion of the path of the conveyor supported by that conveyor frame, said cam rail being engaged by the guide roll to rock said base plate about its forward supporting cross stay as an axis.

References Cited in the file of this patent

UNITED STATES PATENTS

| | | |
|---|---|---|
| 1,036,399 | Witt | Aug. 20, 1912 |
| 1,485,141 | MacDonald | Feb. 26, 1924 |
| 2,083,618 | Salfisberg | June 15, 1937 |
| 2,484,780 | Cluman et al. | Oct. 11, 1949 |